United States Patent Office 3,476,819
Patented Nov. 4, 1969

3,476,819
1,5-DICHLORO-2,2,3,3,4,4-HEXAFLUORO-PENTANE
Floyd D. Trischler, San Diego, Calif., assignor to Whittaker Corporation, Los Angeles, Calif., a corporation of California
No Drawing. Filed June 3, 1966, Ser. No. 554,957
Int. Cl. C07c *19/08, 17/16*
U.S. Cl. 260—653                                1 Claim

ABSTRACT OF THE DISCLOSURE

This patent described the novel compounds of the formula:

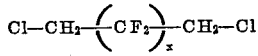

wherein $x$ is an integer of from 1 to about 10. The patent also describes the preparation of the above compounds by reacting the corresponding diol with thionyl chloride, particularly in the presence of pyridine.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a novel group of α,ω-dichloro polyfluorinated alkanes and to their method of preparation.

Various mixed haloalkane compounds have been developed. These compounds have been prepared in a variety of ways. For example, by the addition of hydrogen fluoride to chloroalkenes, and by the reaction of a polychloroalkane with antimony trifluoride. These procedures have various disadvantages. Thus, when the hydrogen fluoride method is used, addition takes place across the double bond of the chloroalkene, and only one fluorine atom can be introduced per double bond. For this reason, highly fluorinated mixed haloalkanes cannot be obtained in this way since polyunsaturated chloroalkenes are difficult to prepare. The use of antimony trifluoride is undesirable since the reaction involves the substitution of chlorine for fluorine. The byproduct chlorides represent a relatively inefficient use of the chlorine.

In contrast to the prior art, the present invention provides a simple and direct route to mixed haloalkanes. The yields obtained are high and the utilization of the halogens is improved. In addition, the present invention permits the synthesis of a novel class of mixed haloalkanes which will be valuable in many laboratory and industrial applications.

It is an object of the present invention to provide a novel method for the preparation of α-ω-dichloro fluorinated alkanes.

A further object of the invention is to provide a more efficient route to the production of mixed haloalkanes.

Still another object of the invention is to provide the novel α,ω-dichloro-polyfluorinated alkanes in good yield and high purity.

More particularly, it is an object of my invention to prepare novel α,ω-dichloro-polyfluorinated alkanes by reaction of the corresponding alcohols with thionyl chloride, the cleavage of the carbon-hydroxy bond and the substitution of chlorine taking place in a surprisingly simple and effective manner.

It is also an object of the invention to provide a novel class of compounds which are capable of many uses in the chemical and related arts.

These and other objects and advantages of the invention will become apparent from the more detailed description which follows.

Briefly, the invention relates to novel α,ω-dichloro polyfluorinated alkanes of the formula

wherein $x$ is an integer of from 1 to about 10. The invention also includes the method of preparing these compounds by the reaction of the corresponding diol with thionyl chloride in accordance with the following reaction equation:

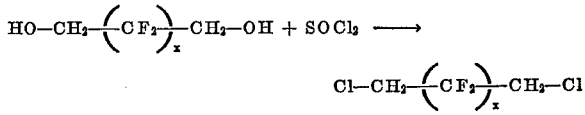

wherein $x$ is as defined above.

The conversion of the fluoroalcohols to the dichloro fluorinated alkanes is most surpising. Previously, it has been reported (J. Org. Chem., 26, 4021–26) that the fluoroalcohols are cleaved only with difficulty at the carbon-oxygen bond. Thus, it was believed that the direct exchange of the hydroxyl function for a halide was difficult or impossible. Contrary to what has been suggested in the prior art, I have found that the reaction of the present invention proceeds with ease and in high yields to provide a novel class of chemical compound.

The synthesis of the α,ω-dichloro polyfluorinated alkanes is preferably, although not necessarily, carried out in the presence of pyridine. The thionyl chloride is normally used in a stoichiometric excess over the amount of the diol reactant. However, proportions are not critical in the reaction. The reaction provides a high yield of over 70% of the desired α,ω-dichloro polyfluorinated alkane under a wide range of conditions. However, maximum yields are normally to be expected when the reaction is carried out at 50–125° C. for 10 to 50 hours. Generally, stirring during the reaction improves the contact of the reactants.

The α,ω-dichloro polyfluorinated alkanes are isolated and purified in conventional manner by distillation, filtration, and washing. It has been found that product purities of over 90% are easily attainable by the practice of the present invention.

The following example is presented solely to illustrate the invention and should not be regarded as limiting in any way. In the example, the parts and percentages are by weight unless otherwise indicated.

EXAMPLE 2,2,3,3,4,4 - hexafluoro - 1,5 - pentanediol (63.3 g., 0.3 mole) was dissolved in pyridine (100 ml.) in a 500-ml., three-necked flask equipped with a stirrer, condenser with drying tube, addition funnel and thermometer. Distilled thionyl chloride (143.0 g., 1.2 mole) was slowly added to the diol solution with stirring. The solution was mixed for 24 hours at 80° to 90° C. The slurry was cooled, filtered, and distilled. The fraction boiling at 142° C. to 144° C. was collected, diluted with ether and washed successively with dilute HCl, dilute sodium bicarbonate, and water. The ether layer was dried with MgSO₄. The MgSO₄ was removed by filtration and the ether evaporated to yield 55.2 g. of 1,5-dichloro-2,2,3,3,4,4-hexafluoropentane product. The yield was 74%. The purity was 92%.

*Elemental analysis.*—Calculated: Cl, 28.6%; C, 24.1%; H, 1.6%; F, 45.8%. Found: Cl, 28.7%; C, 24.2%; H, 1.8%; F, 45.6%.

By the foregoing procedure, 2,2,3,3,4,4,5,5-octafluoro-1,6-hexanediol may be converted to 1,5-dichloro-2,2,3,3,-4,4,5,5 - octafluorohexane, 2,2,3,3,4,4,5,5,6,6,7,7 - dodecafluoro-1,8-octanediol to 1,8-dichloro-2,2,3,3,4,4,5,5,6,6,7,7-dodecafluoro-octane, and 2,2-difluoropropanediol is reacted with chloride to 1,3-dichloro-2,2-difluoropropane.

The present invention provides a unique composition of matter. Notably, the literature has not heretofore disclosed the conversion of any high fluorinated diol to the corresponding dihalo compound. Moreover, the novel compounds of the present invention are widely useful in the preparation of other chemical compounds, so solvents, fire extinguishing agents, flame retardants and the like. For example, the compounds may be utilized in a manner similar to other halohydrocarbons to extinguish fires by providing an environment or blanket which will not support combustion.

While there has been described what is at present considered preferred embodiments of the present invention, it will be appreciated by those skilled in the art that various changes and modifications can be made therein without departing from the essence of the invention and it is intended to cover herein all such changes and modifications as come within the true spirit and scope of the appended claim.

1. The compound 1,5-dichloro-2,2,3,3,4,4-hexafluoropentane.

References Cited
UNITED STATES PATENTS
2,099,357  11/1937  Werntz _____ 260—654
3,080,430  3/1963  Cohen _____ 260—653

FOREIGN PATENTS
595,539  12/1947  Great Britain.

OTHER REFERENCES
Knunyants et al., Russian Chemical Reviews 32, 461–476, September 1963, esp. p. 464.

White, Chem. Abs. 62, 15610b (1965) citing Anal. Chem. 37(3), 403–405, March 1965.

Henne et al., J. Am. Chem. Soc. 65, 2362–2363 (1943).

DANIEL D. HORWITZ, Primary Examiner

U.S. Cl. X.R.

252—2, 8.1